United States Patent

[11] 3,587,610

| [72] | Inventor | Lawrence W. Langley<br>Corning, N.Y. |
|---|---|---|
| [21] | Appl. No. | 804,892 |
| [22] | Filed | Mar. 6, 1969 |
| [45] | Patented | June 28, 1971 |
| [73] | Assignee | Corning Glass Works<br>Corning, N.Y. |

[54] FLUID MOTION SENSOR
5 Claims, 3 Drawing Figs.

[52] U.S. Cl. .................................................. 137/81.5
[51] Int. Cl. ................................................... F15c 1/04,
                                                          F15c 3/00
[50] Field of Search ..................................... 137/81.5

[56] References Cited
UNITED STATES PATENTS

| 3,159,168 | 12/1964 | Reader | 137/81.5 |
| 3,282,562 | 11/1966 | Bauer | 137/81.5X |
| 3,371,540 | 3/1968 | Colombani et al. | 137/81.5X |
| 3,379,204 | 4/1968 | Kelley et al. | 137/81.5 |
| 3,392,739 | 7/1968 | Toplin et al. | 137/81.5X |
| 3,395,719 | 8/1968 | Boothe et al. | 137/81.5 |
| 3,410,290 | 11/1968 | Phillips | 137/81.5 |
| 3,429,229 | 2/1969 | Henke | 137/81.5X |
| 3,433,238 | 3/1969 | Nightingale | 137/81.5 |
| 3,447,383 | 6/1969 | Camarata | 137/81.5 |

*Primary Examiner*—Samuel Scott
*Attorney*—Sughrue, Rothwell, Mion, Zinn and Macpeak ABSTRACT: A center-output fluid flip-flop is switched between its two states by back pressure signals across its control ports representing successive teeth on a rotating wheel. Normal flip-flop outputs are suppressed, and the output signal occurs only when the flip-flop changes state.

INVENTOR
LAWRENCE W. LANGLEY

BY *Sughrue, Rothwell, Mion, Zinn & Macpeak*

ATTORNEYS.

FLUID MOTION SENSOR

BACKGROUND OF THE INVENTION

1. Field of the Invention

This invention relates to devices for sensing the movement of a toothed member, such as a rotating wheel, and more particularly, to motion sensors especially useful in the machine tool control field, wherein a chain of fluid pulses represents the extent of such movement.

2. Description of the Prior Art

Various types of sensors are employed for sensing relative movement between stationary and moving objects, such as the rotation of a machine tool shaft. For instance, the shaft may carry a permanent magnet or the like and a stationary pickup coil may be positioned in the path of the rotating magnetic field. Flueric and fluidic devices as control elements characterized by the absence of moving parts have general application to both the simplified and more complex control systems. Attempts have been made to sense both linear motion and rotary motion by sensing the effect on a fluid stream carried by such devices as it impinges upon the surface of a moving member.

The known systems have been unsuccessful because the resultant signals have not been indicative of the true rate of rotary or linear motion, the indication has not been sufficiently rapid for sensitive control systems and in some cases, the fluid motion sensor is dependent upon the accuracy in the machine tolerance of the sensor components.

Further, attempts have been made to direct a pressurized fluid against a rotating toothed wheel with the variation in fluid pressure existing in the nozzle discharging fluid against the face of the tooth wheel being momentarily changed during passage of a tooth, to provide a fluid pressure variation sufficient to establish an indication of tooth movement. Such systems, however, have been unable to eliminate errors due to reception of spurious signals and the sensor lacks the requisite sensitivity for sophisticated control systems which employ the same.

SUMMARY OF THE INVENTION

This invention is directed to a fluidic system for sensing movement of a toothed member. A source of fluid pressure is delivered to a pair of orifices at spaced positions along the path of movement of the toothed member and spaced slightly from the tip ends of the teeth. The orifices are separated by a distance substantially corresponding to ½, 1½, 2½ or the like of the pitch of said teeth. A fluid flip-flop, including a power stream inlet and a pair of outlet passages for alternately receiving the power stream, has its control ports fluid coupled to respective orifices, which lie on either side of the flip-flop power stream, downstream of the power stream inlet. Means are carried by the fluid flip-flop for sensing movement of the power stream from one of the outlets to the other to indicate member movement a distance corresponding to tooth pitch.

Preferably, a common power supply directs pressurized fluid to each orifice, with fluid restriction means carried in the supply passage between the common supply and the orifice. The control ports for the fluid flip-flop are coupled to respective supply passages intermediate of their fluid restrictor and orifice. A third outlet passage, coaxial with the flip-flop inlet nozzle, acts as the means for sensing movement of the tooth member by receiving a momentary fluid output pulse.

The sensing system may further include a saturating pulse amplifier and fluid diode between the central output passage and an integrator, which comprises a volume chamber and fluid restriction in series.

DESCRIPTION OF THE PREFERRED EMBODIMENT

Figure 1:
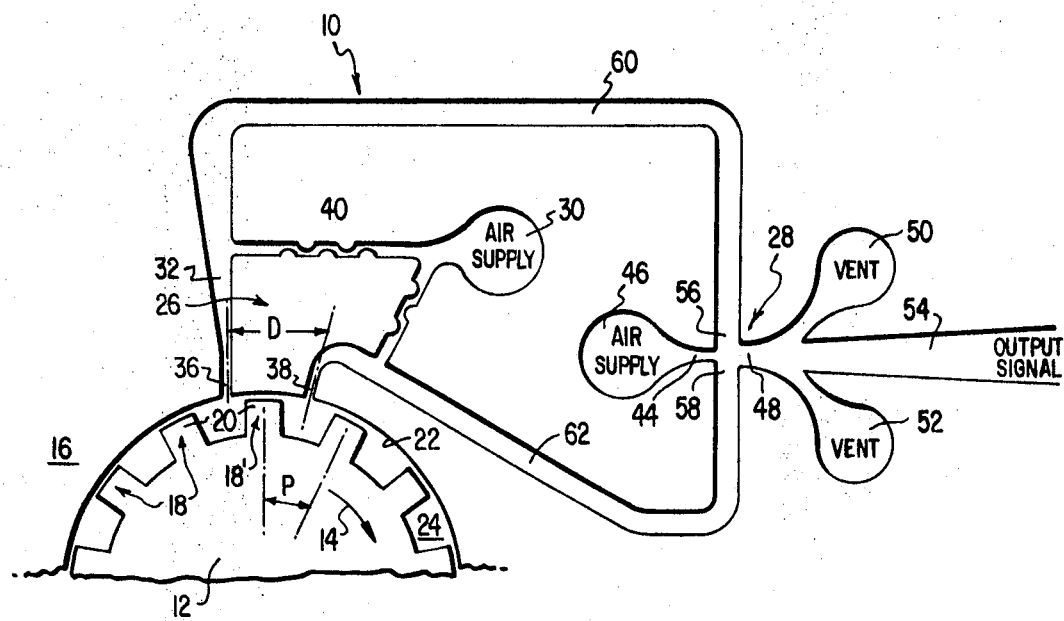
FIG. 1 is a schematic view, partially in section, of the improved fluid motion sensor of the present invention.

Referring to the drawing, the fluid motion sensor 10 of the present invention is applied particularly to the machine tool control field, in which case, the rotary motion of a toothed wheel 12, which is mounted for rotation about the wheel axis (by means not shown) may be readily accomplished. It is to be understood that this invention is not limited to the machine tool control field and comprehends sensing rotary or linear motion as well as velocity. The toothed wheel 12 is driven by machine drive means (also not shown). A casing 16 provides a circular shroud about the tooth wheel such that the wheel teeth 18 have their tips 20 spaced slightly from the curved wall 22. The wheel 12 rotates within a cavity 24 formed therebetween. The teeth 18 are spaced about the periphery of the wheel having a pitch indicated by P which represents a given increment of angular rotation of the wheel.

In braking control systems and machine control systems, it is often desirable to provide a signal whose magnitude is indicative of the rate of rotary or linear motion of a moving member. While in many cases, a strict proportionality of the indication is not vital to the operation of the system, a rapid indication is desired. Where the control or braking system is fluidic in nature, it is desirable to have an all-fluid speed indication, preferably one which does not depend for its accuracy on the machine tolerance. In this case, the present system is not dependent upon the precision in manufacture of the tooth wheel 12 but is achieved rather from the particular fluid sensor, including the back pressure sensor, indicated generally at 26, and a special fluid amplifier in the form of flip-flop or bistable device 28. In this respect, back pressure sensor 26 includes a pressurized air supply 30 which directs pressurized fluid, such as air from a source (not shown), through supply passages 32 and 34 for discharge at respective sensor orifices 36 and 38 in impingement against the face of rotating wheel 12. It is noted that the orifices 36 and 38 are positioned so that the openings are in the curved shroud surface 22 and have their axes circumferentially separated a distance D which is substantially ½ of the tooth pitch P. This spacing may also be 1½, 2½ or the like times the tooth pitch so long as one orifice overlies a tooth while the other orifice is simultaneously positioned over a valley between the teeth.

In order to isolate one passage 32 from the other, 34, fluid restrictors 40 and 42 are placed within each sensor supply passage 32 and 34, respectively. Thus, with a positive pressure fluid being supplied at air supply inlet 30, the rotation of the tooth wheel causes, when one of the wheel teeth underlies an orifice, an increase in pressure within that respective passage, intermediate of its fluid restrictor and the orifice. For instance, assuming rotation in the direction of arrow 14, the movement of tooth 18' to a position where it underlies, but is spaced slightly from orifice 38, causes a momentary increase in the back pressure within the passage 34 carrying this orifice. Simultaneaously, orifice 36 will be positioned over a valley.

A second important element of the fluid sensor of the present invention comprises the special fluid bistable amplifier or flip-flop 28. The fluid flip-flop includes a power stream inlet nozzle 44 which directs the power stream from air supply 46 through amplifier interaction chamber 48 to either downstream outlet or vent 50 or 52 under conventional fluid amplifier principles. It is noted that a third outlet 54 is provided intermediate of angled outlets 50 and 52, outlet 54 being in line with the inlet nozzle 44. It is this middle or inline outlet passage 54 which is employed for sensing the movement of the tooth wheel one tooth position, since during operation of the device, for each movement of the wheel one tooth pitch, two fluid output pulses will occur in the central outlet passage 54 as the bistable or fluid flip-flop 28 switches the power stream from outlet or vent 50 to outlet or vent 52 and returns the same.

In this respect, the fluid flip-flop 28 is controlled in a conventional manner by opposed control ports 56 and 58 on either side of the power stream of the amplifier interaction chamber 48 just downstream of inlet nozzle 44. The left-hand control port 56 is fluid coupled to supply passage 32 intermediate of fluid restrictor 40 and orifice 36 by means of fluid passage 60. In like fashion, control port 48 of the fluid flip-flop 28 is fluid coupled to supply passage 34 intermediate of fluid restrictor 42 and orifice 38 by a fluid passage 62.

Successive teeth cause the flip-flop or bistable device 28 to be twice reversed in state, since the back pressure sensors alternately have the fluid pressure therein increased to the extent necessary to create sufficient fluid pressure differential across control ports 56—58 to cause the power stream to flip from one outlet 50 to the other, 52, and vice versa. Since the outlets 50 and 52 are vented, the only time an output signal is produced in the axially aligned outlet 54 is during switching of the jet from one side to the other by a tooth. In this manner, the device eliminates the possibility or error since, in fact, it requires a specific orientation between the tooth wheel and the multiple orifices 36 and 38 to achieve a pressure differential sufficient to cause switching of the power stream or jet from nozzle 44 to the vented outlet not receiving the same.

Rather than employing successive pulses as a digital representation of velocity or rotational movement of the tooth wheel 12, it may be desirable to provide a fluid signal which is a continuous indication of angular velocity, which signal is in proportion thereto. This requires an integration of the flip-flop output signal. The device as shown in FIG. 1 develops a series of short pressure pulses, two for each tooth. Assuming that each pulse is of the same amplitude and duration, integration produces a signal whose amplitude represents rotation rate. The integrator preferably comprises a volume and restrictor connected to central outlet 54.

Figure 2:
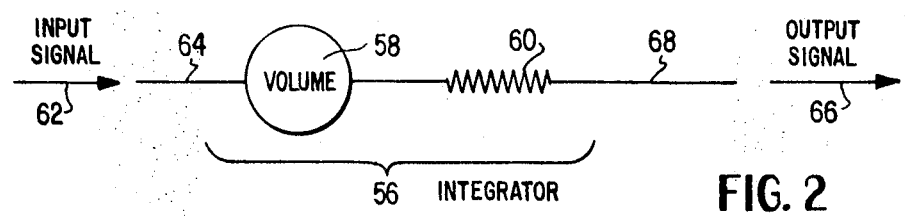
FIG. 2 is a schematic diagram of the fluid integrator employed in the sensing system of the present invention.

Referring to FIG. 2, the integrator 56 comprises a large closed chamber 58 of given volume which is series coupled to a fluid restrictor in the form of resistor 60. The volume chamber 58 and resistor 60 act to receive the output signal from central output 54 for instance, of the apparatus of FIG. 1, as indicated by arrow 62 to integrator inlet 64 and delivers an integrator outlet signal 66 from outlet 68 downstream of the fluid resistor 60.

Figure 3:
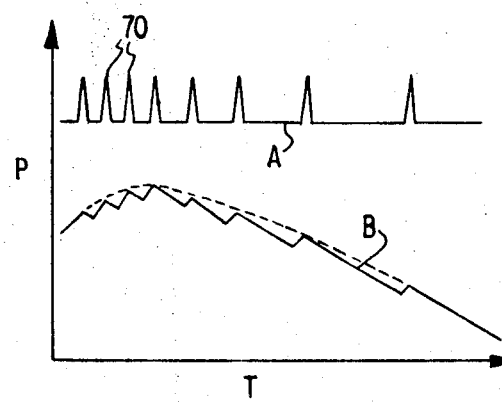
FIG. 3 is a plot of the fluid input signal to the integrator from the sensor of FIG. 1 and the output signal therefrom during change in velocity of the toothed wheel 12 of FIG. 1.

Referring next to FIG. 3, the input signal A is shown as a series of fluid pulses 70 which are initially very close together while the latter pulses are spaced further apart. Just below the line on the graph indicated at A a second jagged curved line B represents the output from the integrator circuit in which case a nominally smooth fluid signal of varying intensity results. Note that when the distance between pulses 70 is decreasing representing increasing pulse frequency, the magnitude of the output signal is increasing indicating increasing velocity. When the distance between pulses 70 is increasing representing decreasing pulse frequency, the magnitude of the output signal is decreasing indicating decreasing velocity.

Alternately, a more complex system of an all-fluid operational amplifier may be employed. The acceptable rotational speeds for wheel 12 are, of course, limited to the switching time of the available fluid flip-flop 28. Flip-flops having switching times of 1 microsecond are envisioned, while the fluid integrator mentioned above, may have a time constant of 0.1 to 1 second.

A pulse amplifier, if used for instance, helps to standardize motion pulses making each one of them the same width and height. Likewise, a diode, if employed, improves integration by reducing the load imposed on the integrator input by the driving amplifier.

The fluid motion sensor of the present invention has application as an indicating tachometer, as a velocity input for servocontrols and as a wheel-slip interlock for the control of aircraft, automotive or railroad braking. Further, the use of a back pressure tooth sensor for providing the pressure differential to the control ports for the fluid flip-flop, prevents contamination of the downstream fluid system by atmospheric dirt, etc.

The system components for the sensor have been illustrated schematically.

In the schematic representation of the present device and the fluid circuitry, it is evident that the back pressure sensor and the fluid flip-flop to which it is coupled may have their passages, amplifier chambers, fluid restrictors, etc. formed in conventional fashion by etching circuitry in an intermediate sheet with outer sheets covering, in sealed fashion, the configured central sheet. The tooth wheel 12, for instance, may comprise a given machine tool gear in which the teeth serve the dual function of acting as a driving or driven member, as well as the moving component of the fluid motion sensor. Further, while ports 30 and 46 are indicative schematically as air supplies, pressurized fluid, other than air, may be employed within the system. The invention contemplates employing compressible and incompressible fluids.

While the invention has been particularly shown and described with reference to a preferred embodiment thereof, it will be understood by those skilled in the art that various changes in form and details may be made therein without departing from the spirit and scope of the invention.

I claim:

1. A fluid sensor for sensing the velocity of a member having a single row of teeth extending in the direction of movement of said member, said sensor comprising: a source of pressurized fluid, a pair of orifices positioned along the path of movement of said toothed member, spaced slightly from the tip ends of said teeth and separated from each other by a distance other than that of the teeth pitch, supply passages for fluid coupling each orifice to said source of fluid, a fluid flip-flop including a power stream inlet, a pair of output passages for alternately receiving said power stream and control passages on either side of the power stream, downstream of said power stream inlet, and means for fluid coupling the control passages to respective ones of said supply passages upstream of said orifices, where the rate of fluid pulses alternately received by said fluid flip-flop output passages is a measure of the velocity of said toothed member.

2. The fluid sensor as claimed in claim 1 further including means for sensing the movement of the flip-flop power stream from one of said outlets to the other.

3. The fluid sensor as claimed in claim 1 further comprising 2 fluid restrictor carried in each supply passage, between said source of fluid and respective orifices.

4. The fluid sensor as claimed in claim 1 further comprising an outlet passage carried by said fluid flip-flop, intermediate of said first and second outlet passages and in line with the flip-flop inlet nozzle, and means for venting said first and second outlet passages whereby, said central outlet passage receives two fluid pulses for each movement of said toothed member a distance of one tooth pitch.

5. The fluid sensor as claimed in claim 4, further comprising a fluid integrator receiving the output of said central outlet passage, said fluid integrator comprising, a resistor and a volume chamber fluid coupled in series.